United States Patent [19]
Smith

[11] Patent Number: 6,126,729
[45] Date of Patent: Oct. 3, 2000

[54] PORTABLE AIR FILTER SYSTEM

[76] Inventor: Gregory S. Smith, 960 Choctaw Ridge, Holts Summit, Mo. 65043

[21] Appl. No.: 09/178,604

[22] Filed: Oct. 26, 1998

[51] Int. Cl.[7] ............................ B01D 29/56; B01D 39/16; B01F 3/04

[52] U.S. Cl. ................................ 96/222; 55/471; 55/481; 55/485; 55/486; 261/101; 261/DIG. 17; 261/DIG. 65; 422/124; 15/42

[58] Field of Search ............................. 55/467, 471, 472, 55/473, 481, 485, 486; 96/222; 15/42; D23/364, 365; 422/124; 261/104, DIG. 17, DIG. 65, 101

[56] References Cited

U.S. PATENT DOCUMENTS

| | | | |
|---|---|---|---|
| 1,847,233 | 3/1932 | Bilde | 55/486 |
| 1,848,576 | 3/1932 | Sandel | 96/222 |
| 3,176,447 | 4/1965 | Omohundro et al. | 55/472 |
| 4,268,285 | 5/1981 | Mason | 96/222 |
| 4,272,261 | 6/1981 | Lynch, Jr. et al. | 96/222 |
| 5,678,279 | 10/1997 | Guhne et al. | 15/42 |
| 5,702,493 | 12/1997 | Everetts et al. | 55/356 |

FOREIGN PATENT DOCUMENTS

| | | | |
|---|---|---|---|
| 2-26621 | 1/1990 | Japan | 422/124 |
| 2-135120 | 5/1990 | Japan | 422/124 |

*Primary Examiner*—David A. Simmons
*Assistant Examiner*—Robert A. Hopkins

[57] ABSTRACT

A portable air filter system having a manually operable spray pump for scenting the air flowing therethrough. The system includes an enclosure having an air inlet and an air outlet, a motor/fan assembly for moving air through the air inlet and out the air outlet, a plurality of air filters disposed between the air inlet and the air outlet, and a manually operable pump in fluid communication with a liquid scented material for scenting the air disposed between the air filters and the air outlet. A brush is attached to a pair of side walls of a wide portion of the enclosure and spans the air inlet. In use the brush aids in dislodging dust and lint from fabric materials.

6 Claims, 2 Drawing Sheets

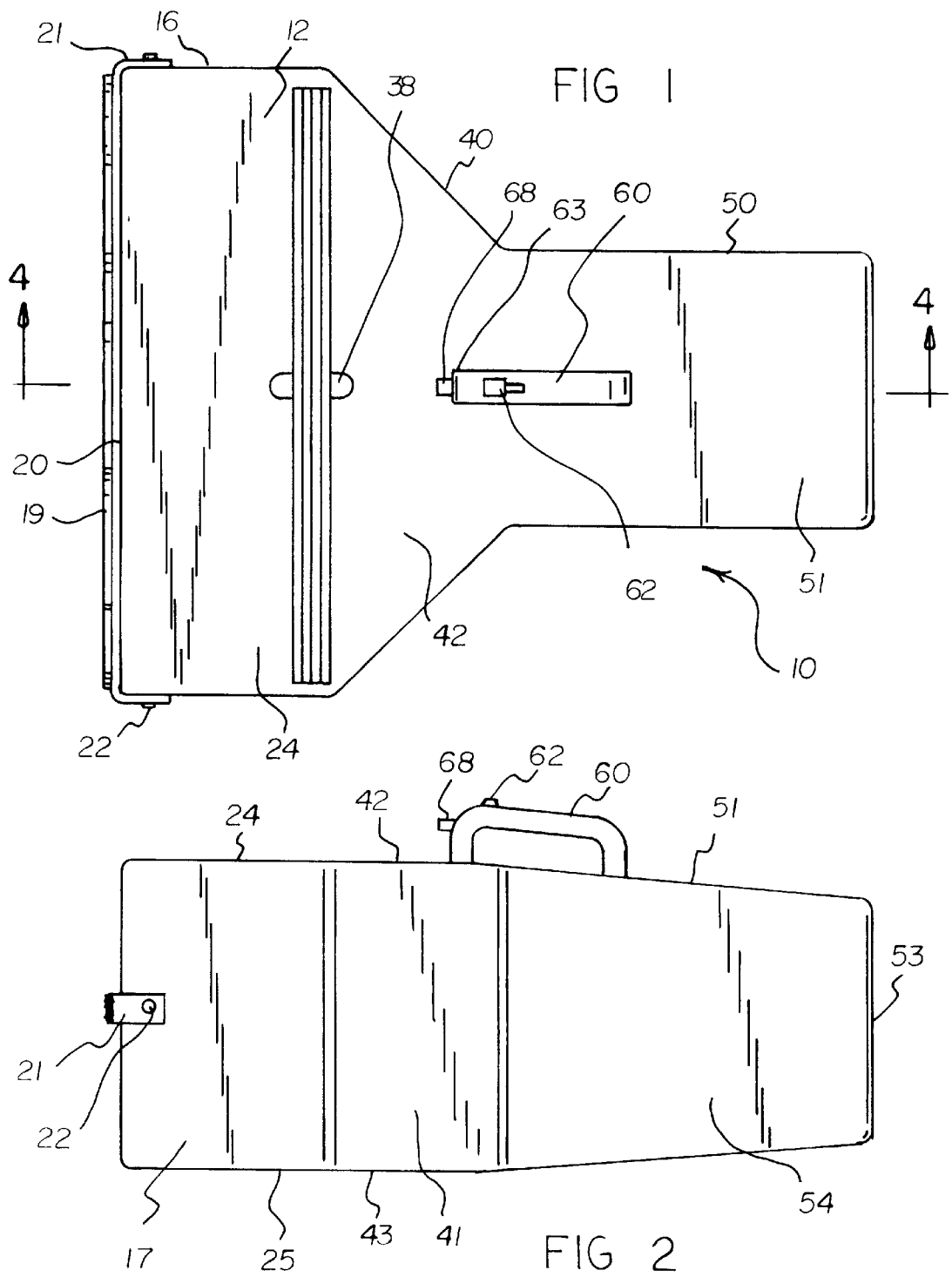

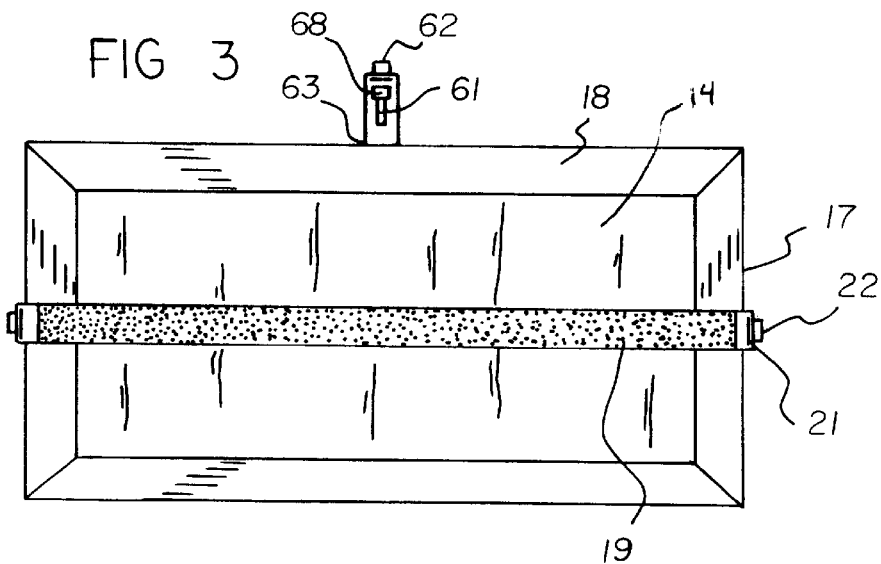
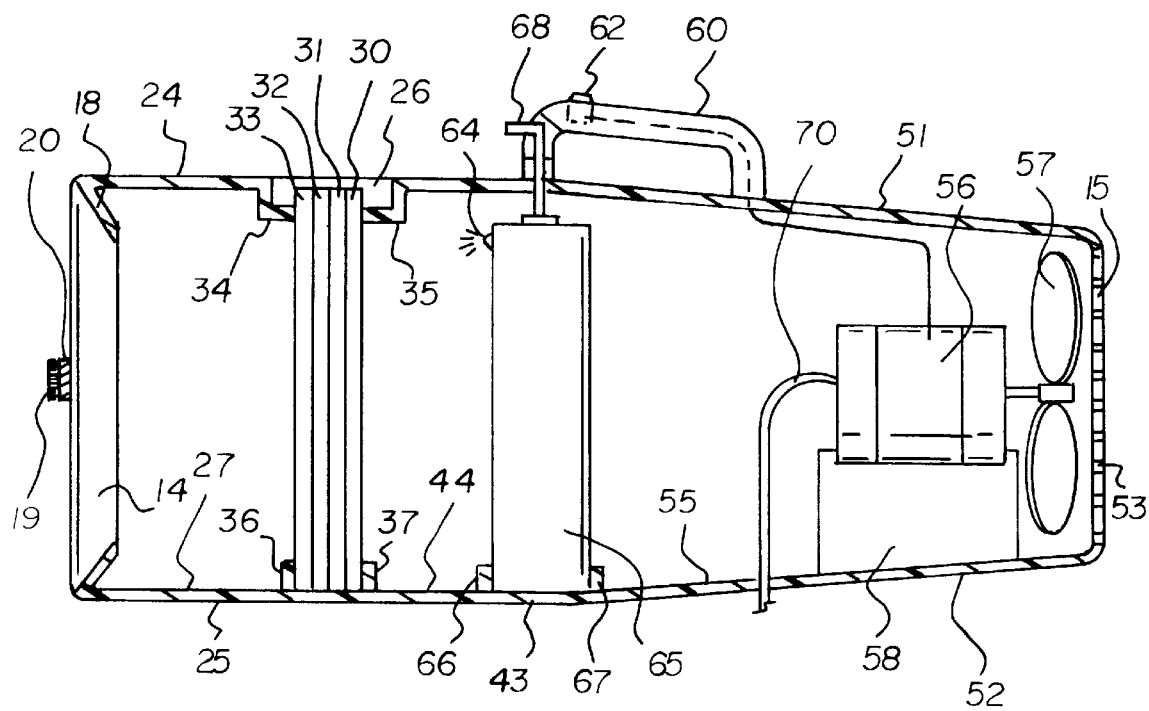

PORTABLE AIR FILTER SYSTEM

Index of Elements for Portable Air Filter System

☐ UNNUMBERED ELEMENTS
☐
☐
☐
☐
☐
☐
☐
☐
☐ 10.Portable Air Filter System
☐ 11.
☐ 12.Enclosure
☐ 13.
☐ 14.Air inlet
☐ 15.Air outlet apertures
☐ 16.Wide portion
☐ 17.Wide portion side wall
☐ 18.Wide portion beveled periphery
☐ 19.Brush
☐ 20.Brush bracket first portion
☐ 21.Brush bracket side member
☐ 22.Fastening means
☐ 23.
☐ 24.Wide portion top wall
☐ 25.Wide portion bottom wall
☐ 26.Recess
☐ 27.Bottom wall inside surface
☐ 28.
☐ 29.
☐ 30.Filter element
☐ 31.Filter element
☐ 32.Filter element
☐ 33.Filter element
☐ 34.Recessed member
☐ 35.Recessed member
☐ 36.Retaining ridge
☐ 37.Retaining ridge
☐ 38.Slot
☐ 39.
☐ 40.Tapered portion
☐ 41.Side wall
☐ 42.Top wall
☐ 43.Bottom wall
☐ 44.Bottom wall inside surface
☐ 45.
☐ 46.
☐ 47.
☐ 48.
☐ 49.
☐ 50.Narrow portion
☐ 51.Top wall
☐ 52.Bottom wall
☐ 53.Rear wall
☐ 54.Side wall
☐ 55.Bottom wall inside surface
☐ 56.Motor
☐ 57.Fan
☐ 58.Mounting block
☐ 59.
☐ 60.Enclosure handle
☐ 61.Slot
☐ 62.On/Off switch
☐ 63.Handle front portion
☐ 64.Nozzle
☐ 65.Canister
☐ 66.Bracket
☐ 67.Bracket
☐ 68.Pump handle
☐ 69.
☐ 70.Power cord
☐ 71.
☐ 72.
☐ 73.

Index of Elements for Portable Air Filter System

☐ 74.
☐ 75.
☐ 76.
☐ 77.
☐ 78.
☐ 79.

BACKGROUND OF THE INVENTION

1. Field of the Invention

The present invention relates to filter systems for removal of airborne particulate matter and more particularly pertains to a new portable air filter system having a manually operable means for scenting the air flowing therethrough.

2. Description of the Prior Art

The use of filter systems for removal of airborne particulate matter is known in the prior art. More specifically, filter systems for removal of airborne particulate matter heretofore devised and utilized are known to consist basically of familiar, expected and obvious structural configurations, notwithstanding the myriad of designs encompassed by the crowded prior art which have been developed for the fulfillment of countless objectives and requirements.

Known prior art filter systems for removal of airborne particulate matter include U.S. Pat. Nos. 5,268,009; 5,035,728; and U.S. Pat. No. Des. 355,962.

While these devices fulfill their respective, particular objectives and requirements, the aforementioned patents do not disclose a new portable air filter system. The inventive device includes an enclosure having an air inlet means and an air outlet means, a means for moving air through the air inlet means and out the air outlet means, a means for filtering air between the air inlet means and the air outlet means, and a manually operable means for scenting the air disposed between the filtering means and the air outlet means.

In these respects, the portable air filter system according to the present invention substantially departs from the conventional concepts and designs of the prior art, and in so doing provides an apparatus primarily developed for the purpose of having a manually operable means for scenting the air flowing therethrough.

SUMMARY OF THE INVENTION

In view of the foregoing disadvantages inherent in the known types of filter systems for removal of airborne particulate matter now present in the prior art, the present invention provides a new portable air filter system construction wherein the same has a manually operable means for scenting the air flowing therethrough.

The general purpose of the present invention, which will be described subsequently in greater detail, is to provide a new portable air filter system apparatus and method which has many of the advantages of the filter systems for removal of airborne particulate matter mentioned heretofore and many novel features that result in a new portable air filter system which is not anticipated, rendered obvious, suggested, or even implied by any of the prior art filter systems for removal of airborne particulate matter, either alone or in any combination thereof.

To attain this, the present invention generally comprises an enclosure having an air inlet means and an air outlet means, a means for moving air through the air inlet means and out the air outlet means, a means for filtering air between the air inlet means and the air outlet means, and a manually operable means for scenting the air disposed between the filtering means and the air outlet means.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new portable air filter system apparatus and method which has many of the advantages of the filter systems for removal of airborne particulate matter mentioned heretofore and many novel features that result in a new portable air filter system which is not anticipated, rendered obvious, suggested, or even implied by any of the prior art filter systems for removal of airborne particulate matter, either alone or in any combination thereof.

It is another object of the present invention to provide a new portable air filter system which may be easily and efficiently manufactured and marketed.

It is a further object of the present invention to provide a new portable air filter system which is of a durable and reliable construction.

An even further object of the present invention is to provide a new portable air filter system which is susceptible of a low cost of manufacture with regard to both materials and labor, and which accordingly is then susceptible of low prices of sale to the consuming public, thereby making such portable air filter system economically available to the buying public.

Still yet another object of the present invention is to provide a new portable air filter system which provides in the apparatuses and methods of the prior art some of the advantages thereof, while simultaneously overcoming some of the disadvantages normally associated therewith.

Still another object of the present invention is to provide a new portable air filter system having a manually operable means for scenting the air flowing therethrough.

Yet another object of the present invention is to provide a new portable air filter system which includes an enclosure having an air inlet means and an air outlet means, a means for moving air through the air inlet means and out the air outlet means, a means for filtering air between the air inlet means and the air outlet means, and a manually operable means for scenting the air disposed between the filtering means and the air outlet means.

Still yet another object of the present invention is to provide a new portable air filter system that includes a brush attached to a wide portion of the enclosure and which spans the air inlet means.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a top plan view of a new portable air filter system according to the present invention.

FIG. 2 is a side elevation view thereof.

FIG. 3 is front elevation view thereof.

FIG. 4 is a partial sectional view taken along line 4—4 of FIG. 1.

DESCRIPTION OF THE PREFERRED EMBODIMENT

With reference now to the drawings, and in particular to FIGS. 1 through 4 thereof, a new portable air filter system embodying the principles and concepts of the present invention and generally designated by the reference numeral 10 will be described.

More specifically, it will be noted that the portable air filter system 10 comprises an enclosure 12, which preferably is formed of a plastic material, having an air inlet 14 and an air outlet means including a plurality of air outlet apertures 15 formed in a rear wall 53 of an enclosure narrow portion 50. A means for moving air through the air inlet 14 and out the air outlet apertures 15 includes a fan 57 operably coupled to an electric motor 56, the electric motor 56 being disposed in the narrow portion 50. A means for filtering air between the air inlet 14 and the air outlet apertures 15 includes a plurality of air filters 30–33, the composition of which will be described hereinafter. A manually operable means for scenting the air includes a conventional pump (not shown) having a handle 68. The pump is in fluid communication with a liquid scented material disposed in a canister 65 and the liquid is dischargable through a nozzle 64 which is directed toward the filter means.

With reference to FIGS. 1 through 4, the enclosure 12 is shown including a wide portion 16, a narrow portion 50, and a tapered portion 40 disposed intermediate the wide portion 16 and the narrow portion 50. The wide portion 16 is shown including a top wall 24, a bottom wall 25 and side walls 17. The tapered portion 40 includes a top wall 42, a bottom wall 43 and side walls 41. The narrow portion 50 includes a top wall 51, a bottom wall 52, a rear wall 53 and side walls 54.

With particular reference to FIG. 3, the wide portion 16 includes a beveled periphery 18 which defines the air inlet 14. The air outlet means is provided by the plurality of apertures 15 formed on the narrow portion rear wall 53 (FIG. 4).

With continued reference to FIG. 4, a fan 57 is shown operably coupled to an electric motor 56. The electric motor 56 is shown mounted in a conventional manner to a mounting block 58 which is affixed to a narrow portion bottom wall inside surface 55. A power cord 70 connects the electric motor 56 to a source of alternating current power and an on/off switch 62 is disposed in an enclosure handle 60 for easy access by the user.

In use the fan is operable to move air through the air inlet 14, through the enclosure 14 and out the air outlet apertures 15. Interposed between the air inlet 14 and the air outlet apertures 15 are a plurality of filters 30–33. A first random oriented glass fiber filter 33 is shown disposed in abutting relationship to a second random oriented glass fiber filter 32. Also shown disposed in abutting relationship to the first and second random oriented glass fiber filters 33 and 32 are an active carbon filter 31 and a cotton fiber filter 30. The filters 30–33 are shown disposed in the wide portion 16 of the enclosure 12 proximate the tapered portion 40 and secured therein by means of retaining ridges 66 and 67 and recessed members 34 and 35. The filters 30–33 are insertable into the enclosure 12 by means of a slot 38 formed on the wide portion top wall 24. A recess 26 is shown formed is partial surrounding relationship to the slot 38. In use the recess 26 allows for easy removal of the filters 30–33 from the enclosure.

With continued reference to FIG. 4, the canister 65 is shown disposed in the tapered portion 40 of the enclosure 12 in such manner that the nozzle 64 faces the filters 30–33, and in particular cotton fiber filter 30. The canister 65 is retained in this position by means of retaining brackets 66 and 67 shown disposed on an inside surface 44 of the tapered portion bottom wall 43. The pump includes a handle 68 which is shown disposed in a slot 61 formed in a front portion 63 of the enclosure handle 60 (FIG. 3). In use the pump handle 68 is depressed to pump the scented liquid from the canister 65 onto the cotton fiber filter 30 for subsequent release through the air outlet apertures 15 into the air of the room wherein the portable air filter system 10 is being used.

With reference to FIGS. 1 through 4, a brush 19 is shown attached to a first portion 20 of a brush bracket. The brush bracket includes a pair of opposite side members 21 which are shown attached to the opposing wide portion side walls 21 by conventional means such as by screws 22. As shown the first portion 20 of the brush bracket spans the air inlet 14 and the brush 19 is disposed distally of the air inlet 14. The brush is preferably formed of nylon bristles and in use aids in dislodging dust and lint from fabric materials.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A portable air filter system comprising:

an enclosure having a wide portion a narrow portion, and a tapered portion disposed intermediate the wide portion and the narrow portion, an air inlet being defined by a wide portion beveled periphery and an air outlet being disposed in the narrow portion;

a means for moving air through the air inlet and out the air outlet;

a first random oriented glass fiber filter, a second random oriented glass fiber filter, an active carbon filter, and a cotton fiber filter, the filters being disposed in the wide portion proximate the tapered portion, the filters being insertable into the wide portion through a slot formed in a wide portion top wall; and a manually operable means for scenting the air disposed between the filtering means and the air outlet.

2. The portable air filter system of claim 1, wherein the wide portion top wall further comprises a recessed portion disposed in partial surrounding relationship to the slot.

3. The portable air filter system of claim 1, wherein the manually operable means for scenting the air between the air inlet and the air outlet further comprise a pump in fluid communication with a liquid scented material disposed in a canister having a nozzle operably coupled to the pump, the canister being disposed in the tapered portion in such manner that the nozzle faces the filters.

4. The portable air filter system of claim 3, wherein the pump has a handle disposed in a slot formed in an enclosure handle.

5. The portable air filter system of claim 1 further comprising a brush attached to a first portion of a brush bracket, the brush bracket having a pair of opposite side members, the side members being attached to opposing wide portion side walls in such manner that the first portion of the brush bracket is disposed in spanning relationship to the air inlet and wherein the brush is disposed distally of the air inlet.

6. The portable air filter system of claim 1, wherein the means for moving air through the air inlet and out the air outlet further comprise a fan operably coupled to an electric motor, the electric motor being disposed in the narrow portion.

\* \* \* \* \*